US012691023B2

(12) United States Patent
Bae

(10) Patent No.: US 12,691,023 B2
(45) Date of Patent: Jul. 28, 2026

(54) EXERCISE ASSISTANCE DEVICE INCLUDING SLIDER IN WHICH BALLS ARE ACCOMODATED

(71) Applicant: Samsung Electronics Co., Ltd., Suwon-si (KR)

(72) Inventor: Kuemjong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 499 days.

(21) Appl. No.: 18/474,649

(22) Filed: Sep. 26, 2023

(65) Prior Publication Data

US 2024/0009058 A1 Jan. 11, 2024

Related U.S. Application Data

(63) Continuation of application No. PCT/KR2022/007760, filed on May 31, 2022.

(30) Foreign Application Priority Data

Jun. 9, 2021 (KR) ........................ 10-2021-0074878
May 20, 2022 (KR) ........................ 10-2022-0062141

(51) Int. Cl.
*A61H 1/02* (2006.01)
*A61H 3/00* (2006.01)

(52) U.S. Cl.
CPC ........... *A61H 1/0244* (2013.01); *A61H 1/024* (2013.01); *A61H 1/0266* (2013.01);
(Continued)

(58) Field of Classification Search
CPC ........ A61H 1/02; A61H 1/024; A61H 1/0244; A61H 1/0266; A61H 1/0277;
(Continued)

(56) References Cited

U.S. PATENT DOCUMENTS 7,628,766 B1 * 12/2009 Kazerooni ........... A61H 1/0255 601/5
9,022,958 B2 * 5/2015 Shimizu ................... A61H 3/00 601/5

(Continued)

FOREIGN PATENT DOCUMENTS

CN 106109186 A * 11/2016 ............ B25J 9/0006
CN 107374912 A 11/2017

(Continued)

OTHER PUBLICATIONS

Translation JP 5802131.*

(Continued)

*Primary Examiner* — Shaun R Hurley
(74) *Attorney, Agent, or Firm* — Nixon & Vanderhye P.C.

(57) ABSTRACT

An exercise assistance device may include: a proximal support part for supporting a proximal portion of a user; a distal support part for supporting a distal portion of the user; an actuator, which is connected to the proximal support part and generates power; a driving frame for transmitting the power from the actuator to the distal support part; a slider housing, which is connected to the distal support part and has a sliding space; a slider that is slidable in the sliding space; a connector for connecting the slider and the driving frame; and a plurality of balls, which are accommodated in the slider, can rotate by at least two degrees of freedom with respect to the slider, and can make point-contact with the slider housing.

20 Claims, 11 Drawing Sheets

(52) U.S. Cl.
CPC ......... *A61H 1/0277* (2013.01); *A61H 1/0281* (2013.01); *A61H 1/0285* (2013.01); *A61H 3/00* (2013.01); *A61H 2003/007* (2013.01); *A61H 2201/1454* (2013.01); *A61H 2201/1614* (2013.01); *A61H 2201/1628* (2013.01); *A61H 2201/1635* (2013.01); *A61H 2201/164* (2013.01); *A61H 2201/165* (2013.01); *A61H 2201/1664* (2013.01)

(58) Field of Classification Search
CPC ...... A61H 1/0281; A61H 1/0285; A61H 3/00; B25J 9/00; B25J 9/10
See application file for complete search history.

(56) References Cited

U.S. PATENT DOCUMENTS

| | | | | |
|---|---|---|---|---|
| 9,475,191 | B1 | 10/2016 | Urata et al. | |
| 10,688,009 | B2 * | 6/2020 | Choi | A61H 1/0285 |
| 11,583,464 | B2 * | 2/2023 | Cho | A61H 3/00 |
| 2012/0316476 | A1 * | 12/2012 | Shimizu | A61H 1/0244 601/35 |
| 2015/0336265 | A1 * | 11/2015 | Choi | A61H 3/00 414/4 |
| 2017/0049658 | A1 * | 2/2017 | Kim | A61H 3/00 |
| 2018/0280178 | A1 * | 10/2018 | Shimada | B25J 9/1045 |
| 2019/0091093 | A1 * | 3/2019 | Lee | A61F 5/0102 |
| 2019/0209415 | A1 * | 7/2019 | Cho | A61H 3/00 |

FOREIGN PATENT DOCUMENTS

| | | | | | |
|---|---|---|---|---|---|
| CN | 109464264 | A | * | 3/2019 | A61H 1/0262 |
| CN | 210061121 | U | | 2/2020 | |
| EP | 3449889 | A1 | * | 3/2019 | A61H 1/024 |
| EP | 3195844 | B1 | * | 4/2021 | A61H 1/0262 |
| JP | 2010188018 | A | | 9/2010 | |
| JP | 2014104185 | A | * | 6/2014 | A61H 1/0262 |
| JP | 5802131 | B2 | * | 10/2015 | A61H 1/0244 |
| KR | 200269499 | Y1 | | 3/2002 | |
| KR | 20070015494 | A | | 2/2007 | |
| KR | 100868818 | B1 | | 11/2008 | |
| KR | 20120024249 | A | | 3/2012 | |
| KR | 101444130 | B1 | | 9/2014 | |
| KR | 101693795 | B1 | | 1/2017 | |
| KR | 20190021665 | A | | 3/2019 | |
| KR | 20210037282 | A | | 4/2021 | |
| WO | WO-2018165261 | A1 | * | 9/2018 | B25J 9/102 |

OTHER PUBLICATIONS

Translation JP 2014104185.*
Translation CN 109464264.*
Translation CN 106109186.*

* cited by examiner

EXERCISE ASSISTANCE DEVICE INCLUDING SLIDER IN WHICH BALLS ARE ACCOMODATED

CROSS-REFERENCE TO RELATED APPLICATIONS

This application is a continuation application of International Application No. PCT/KR2022/007760 designating the United States, filed on May 31, 2022, in the Korean Intellectual Property Receiving Office and claiming priority to Korean Patent Application No. 10-2021-0074878, filed on Jun. 9, 2021, and to Korean Patent Application No. 10-2022-0062141, filed on May 20, 2022, in the Korean Intellectual Property Office, the disclosures of which are all hereby incorporated by reference herein in their entireties.

BACKGROUND

Technical Field

Certain example embodiments relate to an exercise assistance device including a slider in which balls are accommodated.

Description of Related Art

In a rapidly aging society, a growing number of people have experienced inconvenience and pain from joint problems and interest in an assist device for assisting elderly users and/or patients in walking with ease has increased.

A wearable exercise assistance device may include a proximal support part configured to support the proximal portion of a user, a distal support part configured to support the distal portion of the user, an actuator connected to the proximal support part and configured to generate power, a driving frame configured to transmit power to the distal support part, a slider housing connected to the distal support part and having a sliding space, and a slider slidably provided in the sliding space.

The slider may generate squeaks by contacting the slider housing. When the exercise assistance device is repeatedly used, the slider may be damaged or worn out due to friction generated between the slider and the slider housing. To alleviate the damage and wear, there is a need for a new design of a slider structure to minimize or reduce a contact area between the slider and the slider housing.

SUMMARY

According to an example embodiment, an exercise assistance device may include a proximal support part configured to support a proximal portion of a user, a distal support part configured to support a distal portion of the user, an actuator connected, directly or indirectly, to the proximal support part and configured to generate power, a driving frame configured to transmit power from the actuator to the distal support part, a slider housing connected, directly or indirectly, to the distal support part and having a sliding space, a slider slidably provided in the sliding space, a connector configured to connect the slider and the driving frame, and a plurality of balls accommodated in the slider, rotatably provided by at least two degrees of freedom with respect to the slider, and point-contactable with the slider housing.

The ball may include a first exposed part and a second exposed part that are exposed to an outside of the slider and in point-contact with the slider housing, wherein the first exposed part and the second exposed part may be provided on opposite sides of each other based on the slider.

The slider housing may include an inner cover contacting the distal portion of the user and having a first contact surface facing a first surface of the slider, an outer cover connected, directly or indirectly, to the inner cover and having a second contact surface facing a second surface of the slider, and a connector accommodating hole formed in the outer cover and configured to accommodate the connector.

The first exposed part may be point-contactable with the first contact surface and the second exposed part may be point-contactable with the second contact surface.

A minimum distance between the first contact surface and the second contact surface may be the same as a diameter of the ball.

The ball may a state of contacting the first contact surface and the second contact surface at the same time.

The slider housing may further include a cover protrusion protruding from the outer cover in a direction toward the slider.

The connector may include a connector base connected, directly or indirectly, to the slider and movable in the connector accommodating hole and a connector body formed in a direction stacked from the connector base and connected, directly or indirectly, to the driving frame.

At least a portion of the connector body may have a spherical shape.

At least a portion of the plurality of balls may be provided on opposite sides of each other based on the connector.

The slider may include a slider body having a ball accommodating hole that accommodates each of the plurality of balls and a slider cover connected, directly or indirectly, to the slider body and capable of covering a portion of each of the plurality of balls.

The exercise assistance device may further include an elastic band configured to connect the slider housing and the slider.

The elastic band may include a band body connected, directly or indirectly, to the slider and a plurality of band legs extending from the band body and connected, directly or indirectly, to the slider housing.

The elastic band may be provided in plurality, wherein at least a portion of the plurality of elastic bands is provided on opposite sides of each other based on the connector.

According to an example embodiment, an exercise assistance device may include a proximal support part configured to support a proximal portion of a user, a distal support part configured to support a distal portion of the user, an actuator connected, directly or indirectly, to the proximal support part and configured to generate power, a driving frame configured to transmit power from the actuator to the distal support part, a slider housing connected, directly or indirectly, to the distal support part and having a sliding space, a slider slidably provided in the sliding space, a connector configured to connect the slider and the driving frame, and a plurality of rollers accommodated in the slider, rotatably provided with respect to the slider, and line-contactable with the slider housing.

The roller may include a third exposed part and a fourth exposed part that are exposed to an outside of the slider and in line-contact with the slider housing, wherein the third exposed part and the fourth exposed part may be provided on opposite sides of each other based on the slider.

The slider housing may include an inner cover contacting the distal portion of the user and having a third contact surface facing a third surface of the slider and an outer cover connected, directly or indirectly, to the inner cover and having a fourth contact surface facing a fourth surface of the slider.

The third exposed part may be line-contactable with the third contact surface and the fourth exposed part is line-contactable with the fourth contact surface.

A minimum distance between the third contact surface and the fourth contact surface may be the same as a diameter of the roller.

The roller may maintain a state of contacting the third contact surface and the fourth contact surface at the same time.

DETAILED DESCRIPTION

Figure 1:
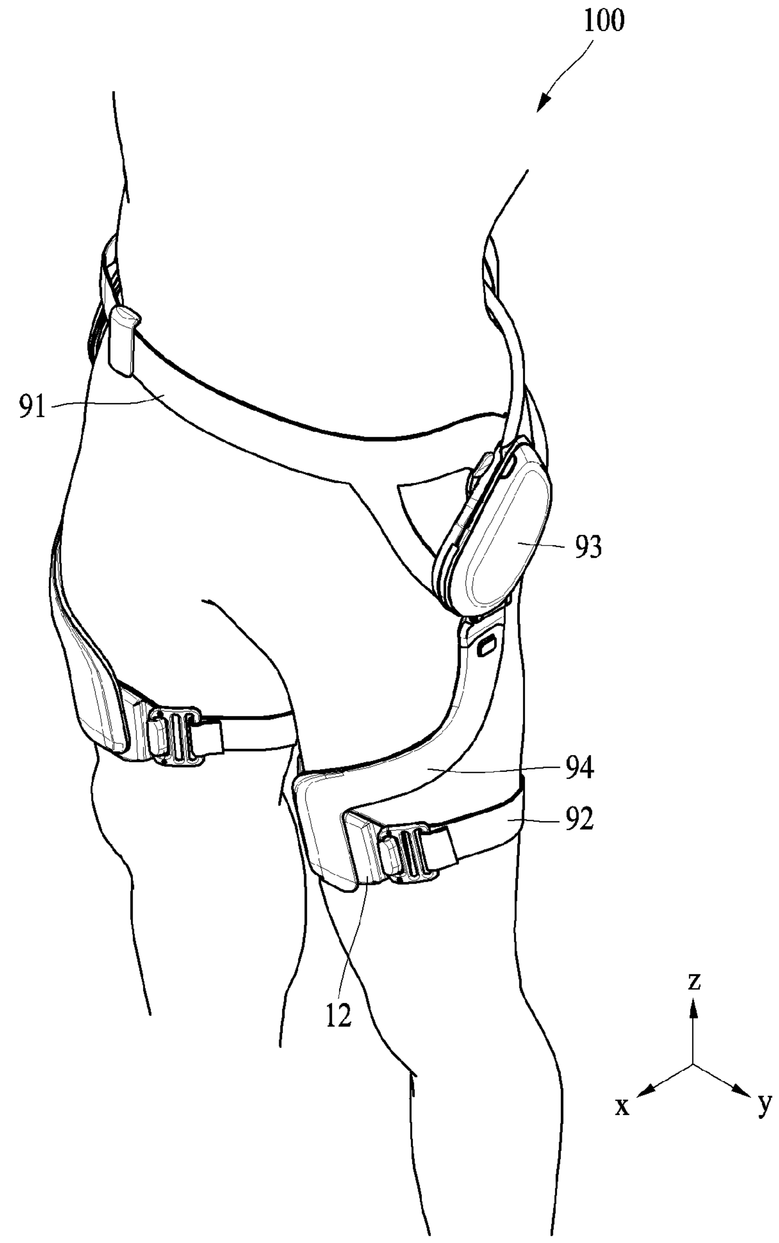
FIG. 1 is a perspective view illustrating a user wearing an exercise assistance device according to an example embodiment.

Hereinafter, example embodiments will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being “connected”, “coupled”, or “attached” to another constituent element, it should be understood that one constituent element can be connected or attached directly to another constituent element, and an intervening constituent element(s) can also be “connected”, “coupled”, or “attached” to the constituent elements.

The same name may be used to describe an element included in the example embodiments described above and an element having a common function. Unless examples and thus, duplicated descriptions will be omitted for conciseness.

Figure 2:
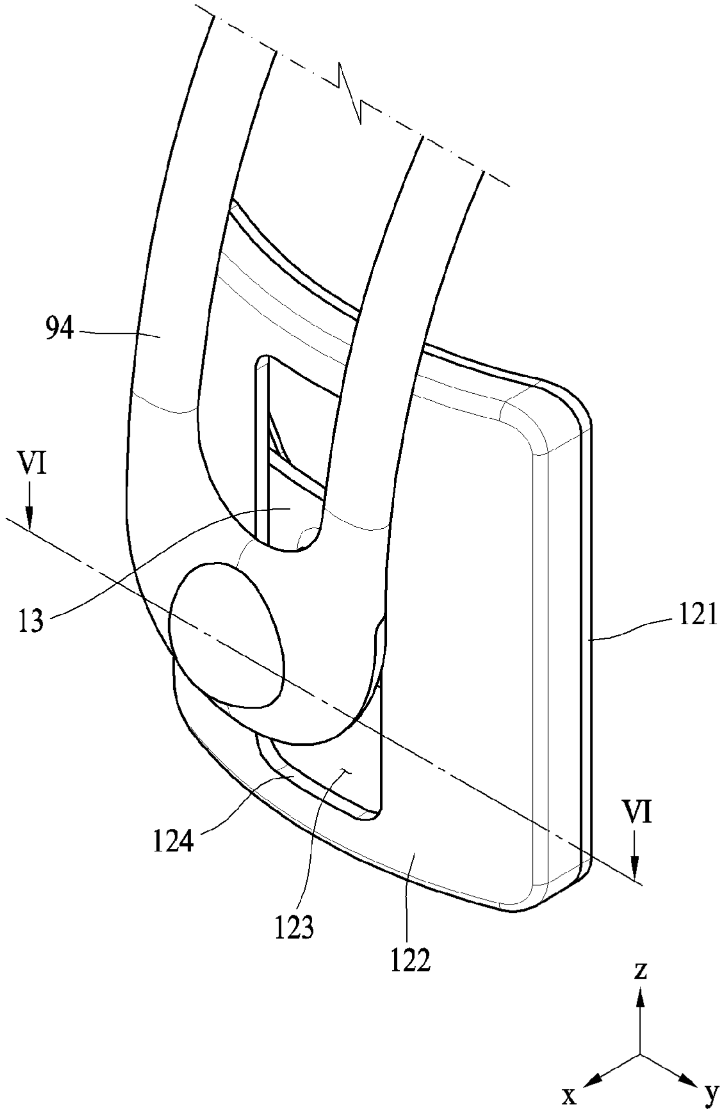
FIG. 2 is a perspective view illustrating a driving frame, a connector, a slider, and a slider housing according to an example embodiment.
Figure 3:
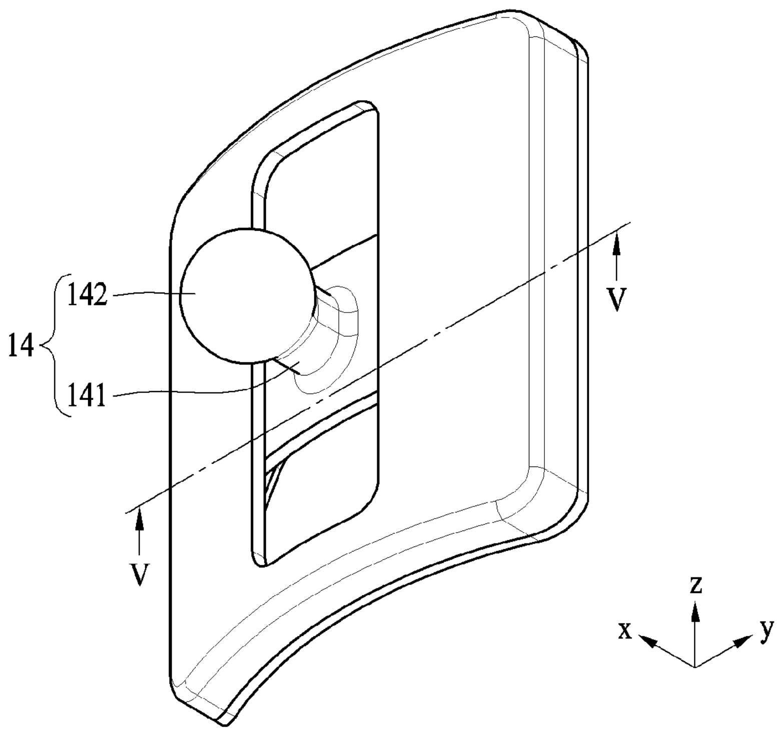
FIG. 3 is a perspective view illustrating a connector, a slider, and a slider housing according to an example embodiment.

FIG. 1 is a perspective view illustrating a user wearing an exercise assistance device according to an embodiment, FIG. 2 is a perspective view illustrating a driving frame, a connector, a slider, and a slider housing according to an embodiment, and FIG. 3 is a perspective view illustrating a connector, a slider, and a slider housing according to an embodiment.

Referring to FIGS. 1 to 3, according to an embodiment, an exercise assistance device 100 may be worn by a user and assist an exercise of the user. The user may be a human, an animal, or a robot, but examples are not limited thereto. The exercise assistance device 100 may assist the exercise of some joints of the upper or lower body of the user. For example, the exercise assistance device 100 may assist the exercise of the lower body of the user by assisting at least one of the hip joint, the knee joint, and the ankle joint of the user. For example, the exercise assistance device 100 may assist the exercise of the upper body of the user by assisting at least one of the shoulder joint, the elbow joint, and the wrist joint of the user. The exercise assistance device 100 may assist the user in walking by assisting the exercise of some joints of the lower body of the user. Hereinafter, the description is provided on the exercise assistance device 100 assisting the user in walking by assisting the exercise of the hip joint of the user, but a wearing part and a target joint of the exercise assistance device 100 are not limited thereto. The exercise assistance device 100 may include a proximal support part 91, a distal support part 92, an actuator 93, a driving frame 94, a slider housing 12, a slider 13, and a connector 14.

In an embodiment, the proximal support part 91 and the distal support part 92 may be disposed on opposite sides of each other based on one body part of the user and respectively support a proximal portion and a distal portion. For example, the proximal support part 91 may support the waist and/or the pelvis of the user and the distal support part 92 may support the thigh, the knee, the calf, and/or the foot of the user. The proximal support part 91 may include a detachable belt for supporting the waist of the user all around. The distal support part 92 may include a detachable belt for supporting the thigh of the user all around.

In another example, the proximal support part 91 and the distal support part 92 may be disposed on opposite sides of each other based on the upper arm of the user, and the proximal support part 91 may support, for example, the shoulder and/or the back of the user and the distal support part 92 may support the forearm of the user. For example, the proximal support part 91 may include a detachable belt for supporting the shoulder of the user all around and the distal support part 92 may include a detachable belt for supporting the forearm of the user all around or a structure surrounding the forearm of the user all around.

In an embodiment, the proximal support part 91 and the distal support part 92 may move relative to each other on a sagittal plane. For example, when the user wearing the exercise assistance device 100 flexes or extends the hip joint of the user, the distal support part 92 may rotate relative to the proximal support part 91 on the sagittal plane.

In an embodiment, the proximal support part 91 and the distal support part 92 may move relative to each other on a frontal plane. For example, when the user wearing the exercise assistance device 100 adducts or abducts the hip joint of the user, the distal support part 92 may rotate relative to the proximal support part 91 on the frontal plane.

In an embodiment, the driving frame 94 and the distal support part 92 may move relative to each other on a transverse plane. For example, when the user wearing the exercise assistance device 100 rotates the thigh of the user, the distal support part 92 may rotate with the thigh of the user while being in close contact with the thigh of the user. That is, the distal support part 92 may rotate relative to the driving frame 94. In this structure, the wearability of the user may increase.

In an embodiment, the actuator 93 may be connected, directly or indirectly, to the proximal support part 91 and generate power. The actuator 93 may include, for example, a motor and a speed reducer. The motor may include at least one of a brush motor, a brushless motor, and a stepping motor. The motor may include at least one of an induction motor and a synchronous motor. The speed reducer may include, for example, a gear train In an embodiment, the driving frame 94 may transmit power generated by the actuator 93 to the distal support part 92. For example, the driving frame 94 may assist the movement of the hip joint of the user. When an output terminal of the actuator 93 rotates in one direction, the driving frame 94 may receive power from the actuator 93 and assist the flexion of the hip joint of the user. When the output terminal of the actuator 93 rotates in the opposite direction to the one direction, the driving frame 94 may receive power from the actuator 93 and assist the extension of the hip joint of the user. The description is provided on the driving frame 94 assisting the exercise of the hip joint of the user, but a function of the driving frame 94 is not limited thereto. For example, when the exercise assistance device 100 is used to assist the exercise of joints of the upper body of the user, the driving frame 94 may assist the exercise of the shoulder or the elbow joint of the user.

In an embodiment, the slider housing 12 may be connected, directly or indirectly, to the distal support part 92 and face the driving frame 94. For example, the slider housing 12 may have a shape surrounding the distal portion of the user. The slider housing 12 may have a sliding space in which the slider 13 may move. For example, the sliding space may be formed in the y-axis direction or the z-axis direction. The slider housing 12 may include an inner cover 121, an outer cover 122, a connector accommodating hole 123, and a cover protrusion 124.

In an embodiment, the inner cover 121 may contact the distal portion of the user. The inner cover 121 may include a support surface contacting the distal portion of the user. For example, the support surface may include a curved surface. The inner cover 121 may have a first contact surface facing a first surface of the slider 13. The first contact surface may be a surface provided on the opposite side of the support surface.

In an embodiment, the outer cover 122 may be connected, directly or indirectly, to the inner cover 121. The edge of the outer cover 122 may contact the edge of the inner cover 121. A sliding space may be provided between the outer cover 122 and the inner cover 121. The outer cover 122 may have a second contact surface facing a second surface of the slider 13. The second surface may be provided on the opposite side of the first surface. The second contact surface may be side-by-side with the first contact surface.

In an embodiment, the connector accommodating hole 123 may be formed at the outer cover 122 and accommodate the connector 14. The connector 14 may move in the connector accommodating hole 123. For example, the moving direction of the connector 14 may be in the y-axis direction or the z-axis direction. The moving range in which the connector 14 may move may be set in advance by adjusting the width of the connector accommodating hole 123.

In an embodiment, the cover protrusion 124 may protrude from the outer cover 122 in a direction toward the slider 13. The cover protrusion 124 may reduce the penetration of foreign materials or moisture into the slider housing 12.

In an embodiment, the slider 13 may be slidably provided in the slider housing 12. For example, the slider 13 may move along a rail that is provided in the slider housing 12. For example, the slider 13 may be moved by the elasticity of a spring that is provided in the slider housing 12. The slider 13 may move along a sliding space. For example, the slider 13 may move in the y-axis direction or the z-axis direction with respect to the slider housing 12. The distal support part 92 may move with respect to driving frame 94.

In an embodiment, the connector 14 may connect the slider 13 and the driving frame 94. The connector 14 may be disposed between at least the slider 13 and the driving frame 94. The slider 13 may not be directly connected to the driving frame 94. The magnitude of torsion, rotation or shearing force transmitted from the driving frame 94 to the slider 13 may decrease. The connector 14 may include a connector base 141 and a connector body 142.

In an embodiment, the connector base 141 may be connected, directly or indirectly, to the slider 13. The connector base 141 may support the connector body 142. The connector base 141 may move in the connector accommodating hole 123.

In an embodiment, the connector body 142 may be formed in a direction stacked from the connector base 141. The connector body 142 may be connected, directly or indirectly, to the driving frame 94. At least a portion of the connector body 142 may have a spherical shape.

Figure 4:
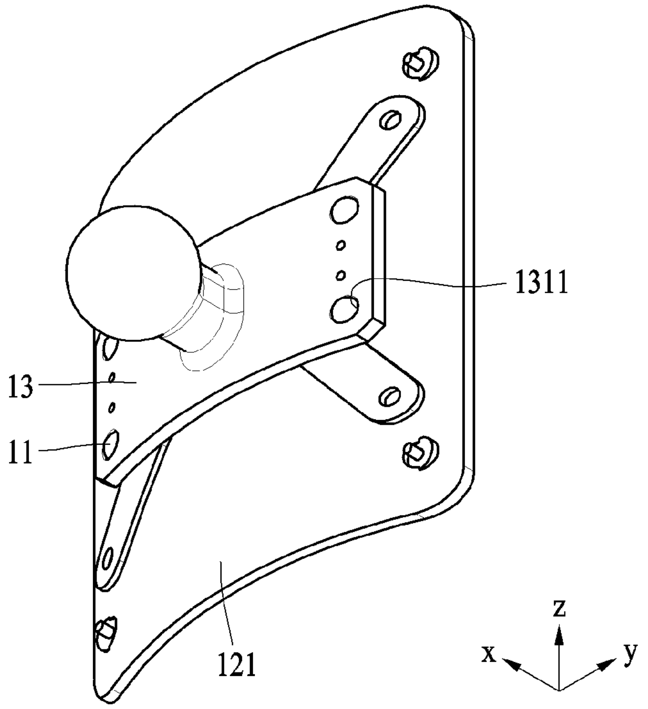
FIG. 4 is a diagram illustrating a connector, a slider, a ball, an elastic band, and a slider housing according to an example embodiment, and a perspective view illustrating an outer cover omitted from FIG. 3.
Figure 5:
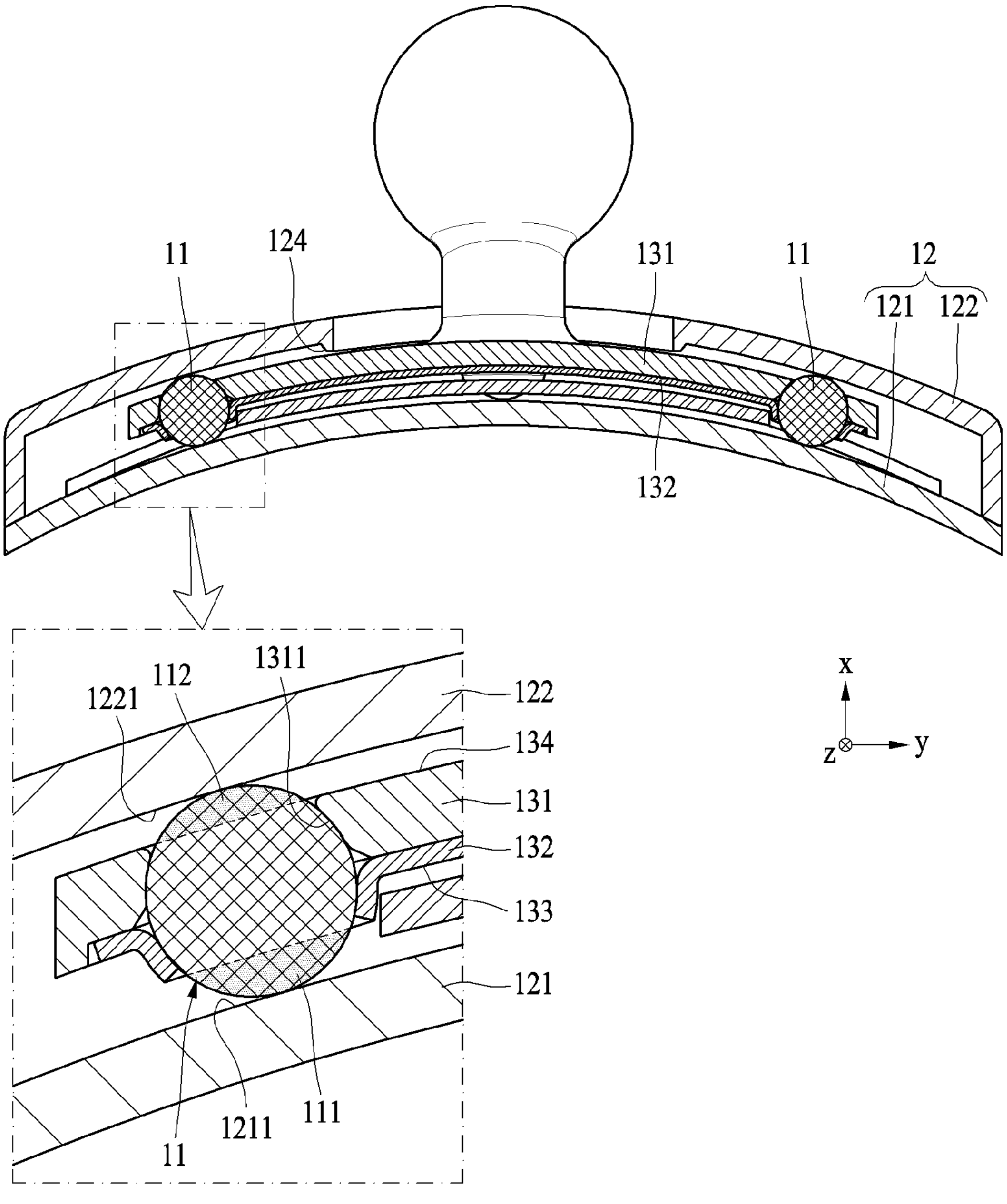
FIG. 5 is a cross-sectional view taken along the line V-V of FIG. 3.

FIG. 4 is a diagram illustrating a connector, a slider, a ball, an elastic band, and a slider housing according to an embodiment, and a perspective view illustrating an outer cover omitted from FIG. 3 and FIG. 5 is a cross-sectional view taken along the line V-V of FIG. 3.

Referring to FIGS. 4 and 5, according to an embodiment, an exercise assistance device may further include a plurality of balls 11. The ball 11 may be accommodated in the slider 13 and rotatably provided by at least two degrees of freedom with respect to the slider 13. For example, the ball 11 may be accommodated in the slider 13 and move in the y-axis direction or the z-axis direction. Through the rolling of the ball 11, the slider 13 may move smoothly in a sliding space.

In an embodiment, the ball 11 may be in point-contact with the slider housing 12. The contact area between the slider housing 12 and the slider 13 may decrease. When the user wearing the exercise assistance device moves forward or backward, a squeak generated between the slider housing 12 and the slider 13 may decrease. Damage or wear of the slider 13 due to friction generated between the slider housing 12 and the slider 13 may decrease. Each of the plurality of balls 11 may include a first exposed part 111 and a second exposed part 112.

In an embodiment, the first exposed part 111 and the second exposed part 112 may be provided on opposite sides of each other based on the slider 13. The first exposed part 111 and the second exposed part 112 may be exposed to the outside of the slider 13 and in point-contact with the slider housing 12.

In an embodiment, the first exposed part 111 may be in point-contact with a first contact surface 1211. The ball 11 may be in point-contact with the inner cover 121 while being accommodated in the slider 13. The contact area between the slider 13 and the inner cover 121 may decrease. Damage or wear of a first surface 133 of the slider 13 due to friction generated between the first surface 133 and the first contact surface 1211 may decrease.

In an embodiment, the second exposed part 112 may be in point-contact with a second contact surface 1221. The ball 11 may be in point-contact with the outer cover 122 while being accommodated in the slider 13. The contact area between the slider 13 and the outer cover 122 may decrease. Damage or wear of a second surface 134 of the slider 13 due to friction generated between the second surface 134 and the second contact surface 1221 may decrease.

In an embodiment, the dust of the slider 13 generated due to wear of the slider 13 may decrease. Failure of the slider housing 12 or the slider 13 may decrease. The durability of the exercise assistance device may increase.

In an embodiment, the ball 11 may maintain a state of contacting the first contact surface 1211 and the second contact surface 1221 at the same time. The minimum distance between the first contact surface 1211 and the second contact surface 1221 may be the same as the diameter of the ball 11. The ball 11 may maintain a state of contacting the inner cover 121 and the outer cover 122 at the same time while being accommodated in the slider 13. The slider 13 may move in the y-axis direction or the z-axis direction without separating in the x-axis direction.

In an embodiment, when the ball 11 maintains a state of contacting the inner cover 121 and the outer cover 122 at the same time, a squeak of the exercise assistance device may decrease. For example, when the user wearing the exercise assistance device moves forward, the slider housing 12 may move in the +x direction. The first exposed part 111 of the ball 11 may maintain a state of point-contacting the first contact surface 1211 of the inner cover 121. The first surface 133 of the slider 13 may not contact the first contact surface 1211 of the inner cover 121. A squeak generated between the first surface 133 and the first contact surface 1211 may decrease. For example, when the user wearing the exercise assistance device moves backward, a squeak generated between the second surface 134 and the second contact surface 1221 may decrease.

In an embodiment, when the user wearing the exercise assistance device moves forward or backward, the relative position of the slider 13 with respect to the slider housing 12 may not be constant. The first exposed part 111 of the ball 11 in point-contact with the first contact surface 1211 and the second exposed part 112 of the ball 11 in point-contact with the second contact surface 1221 may not be constant. Damage or wear of the ball 11 may occur slowly.

In an embodiment, at least a portion of the plurality of balls 11 may be provided on opposite sides of each other based on the connector. The plurality of balls 11 may be the same type of balls. For example, the diameter and material of the ball 11 may be the same. For example, the material of the ball 11 may be metal or plastic. However, the material of the ball 11 is not necessarily limited thereto. Even when one of the plurality of balls 11 is damaged or worn out, the slider 13 may move in a sliding space. The slider 13 may include a slider body 131 and a slider cover 132.

In an embodiment, the slider body 131 may accommodate the plurality of balls 11. The slider body 131 may be connected, directly or indirectly, to a connector base. The cover protrusion 124 may contact the slider body 131. The slider body 131 may have a ball accommodating hole 1311 accommodating each of the plurality of balls 11. For example, at least a portion of the ball accommodating hole 1311 may have the same curvature as the ball 11. The ball 11 may be in surface-contact with the ball accommodating hole 1311.

In an embodiment, the slider cover 132 may be connected, directly or indirectly, to the slider body 131. The slider cover 132 may cover a portion of each of the plurality of balls 11. For example, the slider cover 132 may be disposed between the slider body 131 and the inner cover 121. The plurality of balls 11 may not be separated from the slider body 131.

In an embodiment, when at least one ball 11 is damaged or worn out, the slider cover 132 may be separated from the slider body 131 to replace only the damaged or worn ball 11. The maintenance cost of the exercise assistance device may decrease.

In an embodiment, it is noted that a slider structure in which a ball is accommodated described herein may be applied to various exercise assistance devices in addition to an exercise assistance device for walking assistance. For example, the slider structure in which the ball is accommodated may be applied to an exercise assistance device that assists the knee joint or the ankle joint of the user and may also be applied to a device for the exercise of the upper body of the user.

Figure 6:
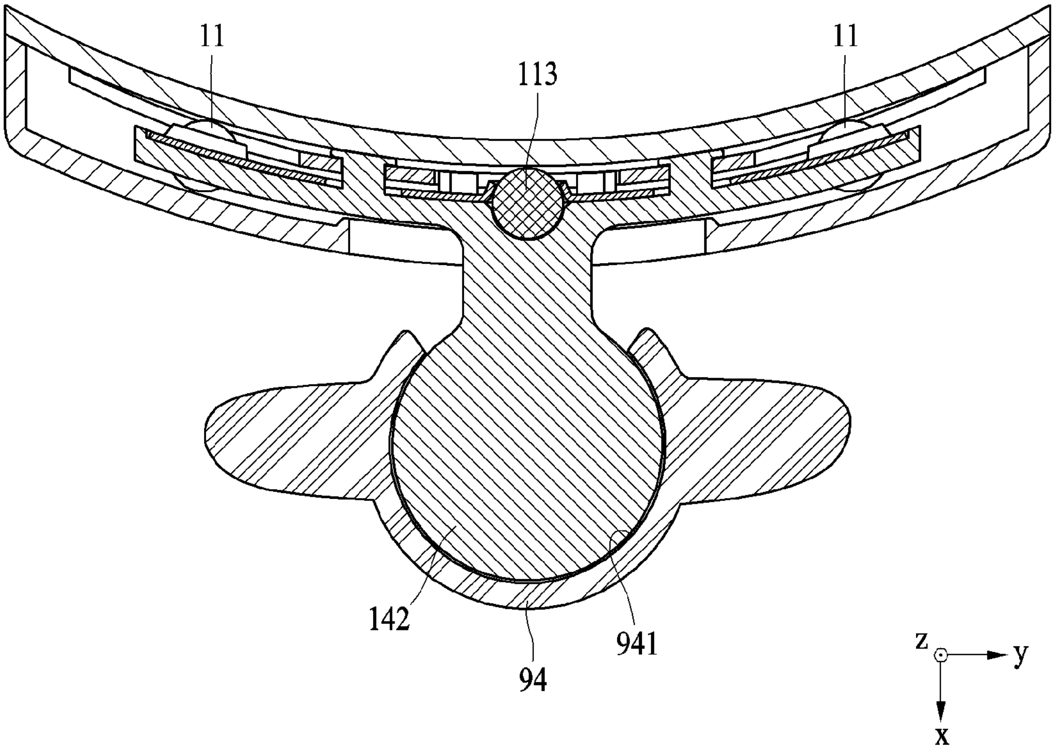
FIG. 6 is a cross-sectional view taken along the line VI-VI of FIG. 2.

FIG. 6 is a cross-sectional view taken along the line VI-VI of FIG. 2.

Referring to FIG. 6, the connector body 142 may be connected to the driving frame 94 through a ball mount coupling structure. The driving frame 94 may include a coupling groove 941 having the same curvature as the connector body 142. The connector body 142 may be inserted into the coupling groove 941. The connector body 142 may be in surface-contact with the coupling groove 941. The connector body 142 may be connected, directly or indirectly, to the coupling groove 941 and form the ball mount coupling structure. The slider 13 may be connected to or separated from the driving frame 94 through the ball mount coupling structure.

In an embodiment, the connector body 142 may rotate while being in surface-contact with the coupling groove 941. A distal support part may move relative to the driving frame 94 and the wearability of the user may increase. For example, when the user walks, the walking speed, the walking direction, or the shape of the distal portion of the user may vary. In this case, the position of a slider housing may be fixed with respect to the distal portion of the user.

In an embodiment, in a state in which the connector body 142 is connected to the driving frame 94, a force greater than or equal to a preset magnitude may be applied to the connector body 142 in a direction away from the driving frame 94. For example, instantaneous external force may be applied to the connector body 142 due to the fall of the user. In this case, the connector body 142 may be separated from the driving frame 94. The distal portion of the user may move independently from the driving frame 94. The distal portion of the user may be protected from instantaneous external force. Damage or failure of an exercise assistance device may decrease. For example, the magnitude of external force transmitted to an actuator through the driving frame 94 may decrease.

In an embodiment, as shown in the drawing herein, a slider may further accommodate one ball 113 in the center of the slider. One ball 113 accommodated in the center of the slider may be in point-contact with a first contact surface and may roll in a connector accommodation hole. For example, one ball 113 accommodated in the center of the slider may be the same type of ball as the plurality of balls 11 that is accommodated in the slider and in point-contact with the first contact surface and a second contact surface.

Figure 7:
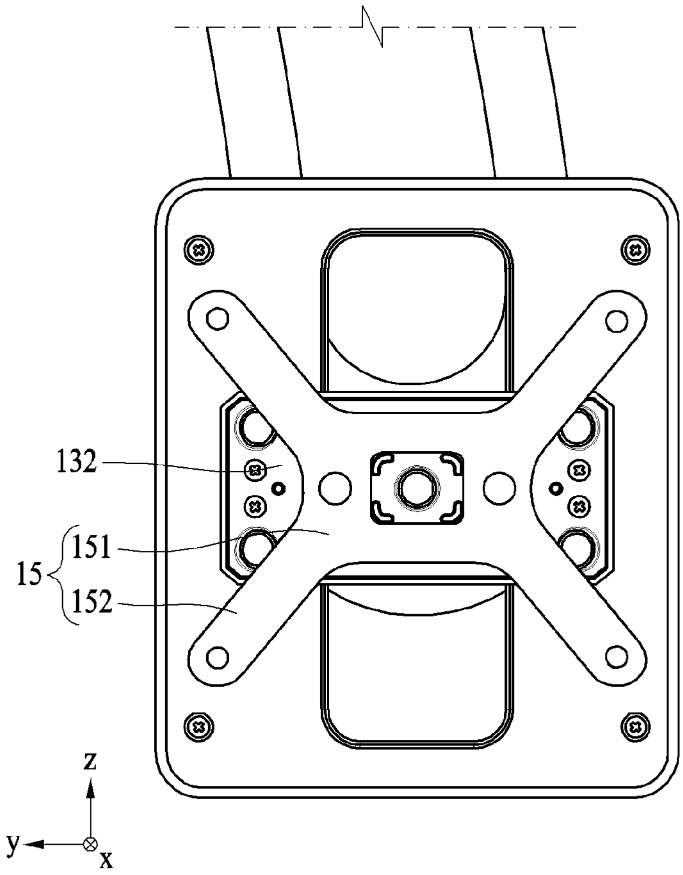
FIG. 7 is a diagram illustrating a driving frame, a slider, a slider housing, and an elastic band according to an example embodiment, and a rear view illustrating an inner cover omitted.

FIG. 7 is a diagram illustrating a driving frame, a slider, a slider housing, and an elastic band according to an embodiment, and a rear view illustrating an inner cover omitted.

Referring to FIG. 7, an exercise assistance device may further include an elastic band 15. The elastic band 15 may connect a slider housing and a slider. The elastic band 15 may be provided in the slider housing. When the slider moves from an original position, the slider may be moved to the original position by the elastic band 15. For example, the original position of the slider may be the center of the slider housing. The magnitude of force applied by the user to move the slider to the original position may decrease. The elastic band 15 may include a band body 151 and a plurality of band legs 152.

In an embodiment, the band body 151 may be connected, directly or indirectly, to the slider. For example, the band body 151 may be connected to the slider cover 132. The band body 151 may move in the y-axis direction or the z-axis direction.

In an embodiment, the plurality of band legs 152 may extend from the band body 151 and be connected, directly or indirectly, to the slider housing. For example, the plurality of band legs 152 may be connected to an inner cover. At least a portion of the plurality of band legs 152 may be provided on opposite sides of each other based on a connector. The band body 151 may be moved to the original position by the elasticity of the band leg 152. The slider may move to the original position.

Figure 8:
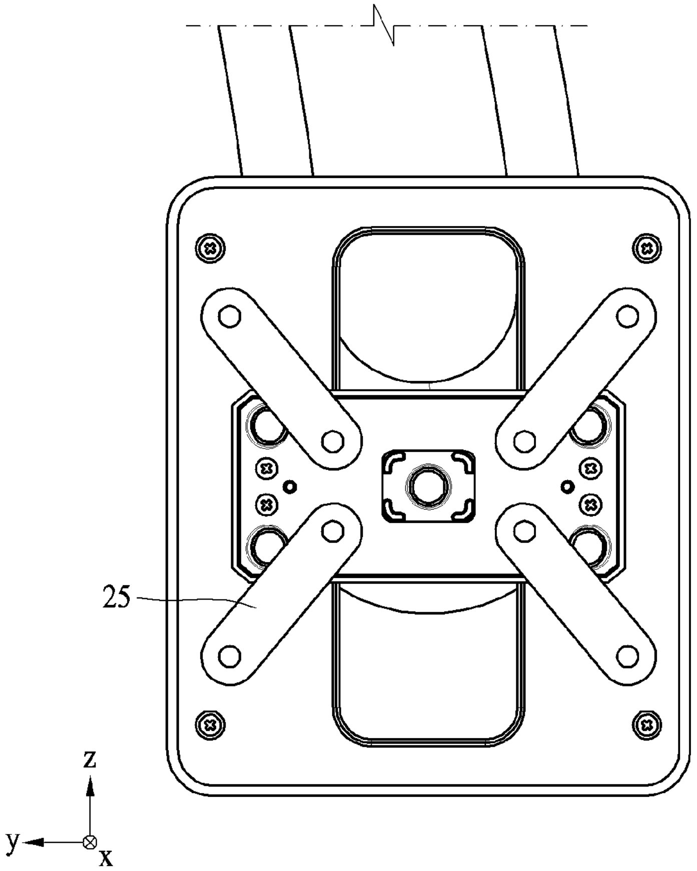
FIG. 8 is a diagram illustrating a driving frame, a slider, a slider housing, and an elastic band according to an example embodiment, and a rear view illustrating an inner cover omitted.

FIG. 8 is a diagram illustrating a driving frame, a slider, a slider housing, and an elastic band according to an embodiment, and a rear view illustrating an inner cover omitted.

Referring to FIG. 8, an elastic band 25 may be provided in plurality. For example, one end of the elastic band 25 may be connected to a slider cover and the other end may be connected to an inner cover of a slider housing. At least a portion of the plurality of elastic bands 25 may be provided on opposite sides of each other based on a connector. The plurality of elastic bands 25 may be the same type of elastic bands. For example, the shape or material of the elastic band 25 may be the same.

In an embodiment, the user may set the magnitude of elasticity required by the user in advance by adjusting the material of the elastic band 25. The user may set the direction of elasticity required by the user in advance by adjusting the number or position of the elastic bands 25. When a portion of the plurality of elastic bands 25 is damaged or worn out, only the damaged or worn elastic bands 25 may be replaced.

Figure 9:
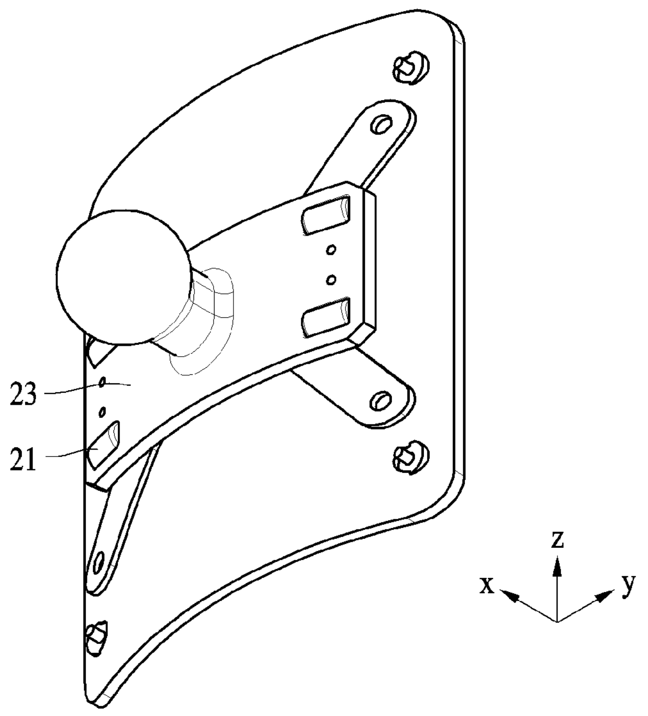
FIG. 9 is a diagram illustrating a connector, a slider, a roller, an elastic band, and a slider housing according to an example embodiment, and a perspective view illustrating an outer cover omitted.
Figure 10:
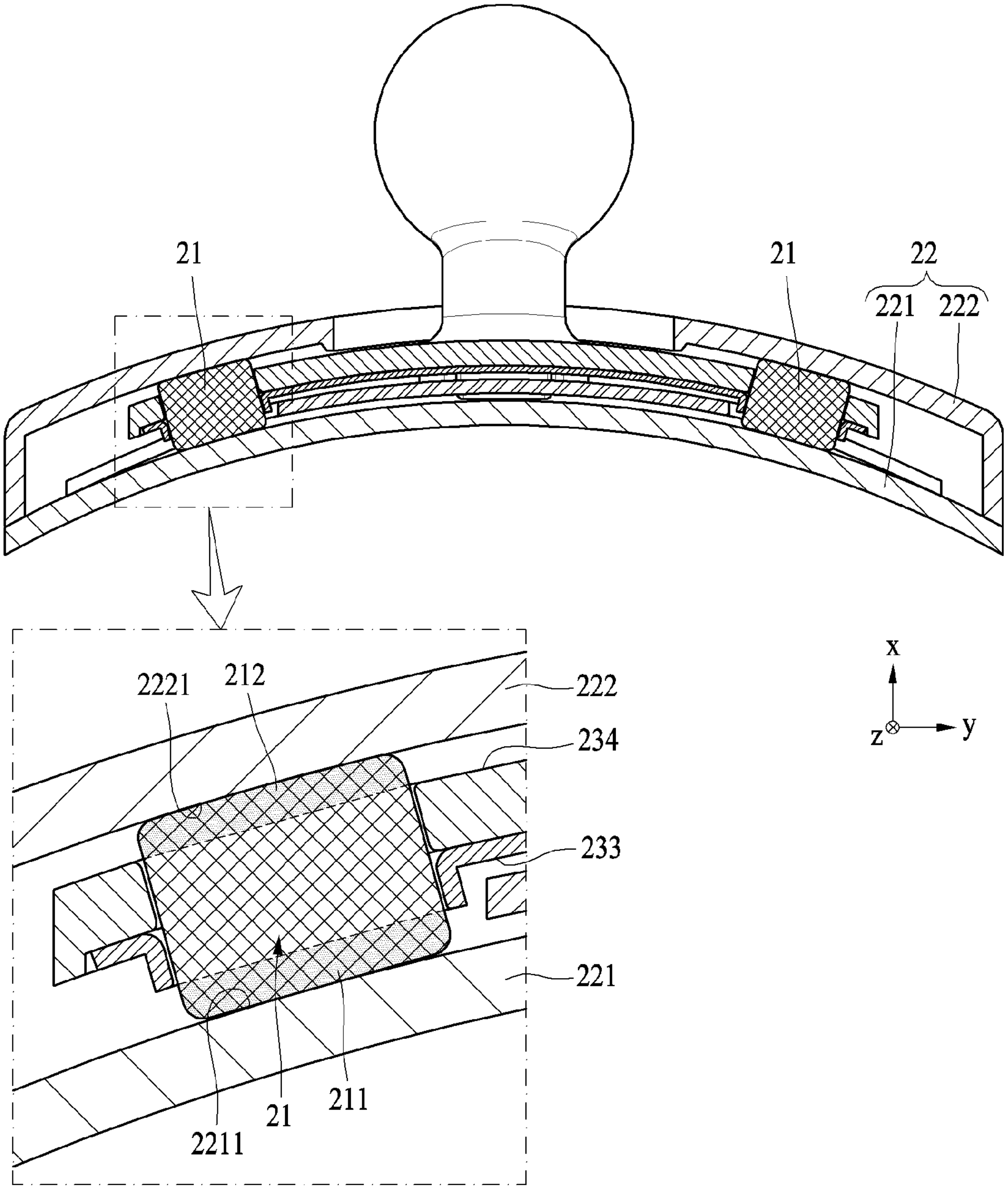
FIG. 10 is a cross-sectional view of a connector, a slider, a roller, a slider housing, and an elastic band according to an example embodiment.

FIG. 9 is a diagram illustrating a connector, a slider, a roller, an elastic band, and a slider housing according to an embodiment, and a perspective view illustrating an outer cover omitted and FIG. 10 is a cross-sectional view of a connector, a slider, a roller, a slider housing, and an elastic band according to an embodiment.

Referring to FIGS. 9 and 10, according to an embodiment, an exercise assistance device may include a roller 21 instead of a ball. The roller 21 may be accommodated in a slider 23 and rotatably provided with respect to the slider 23. For example, the roller 21 in a slider housing 22 may roll in the z-axis direction. For example, the roller 21 may slide in the y-axis direction. The slider housing 22 may include an inner cover 221 and an outer cover 222.

In an embodiment, the inner cover 221 may contact the distal portion of the user. The inner cover 221 may have a third contact surface 2211 facing a third surface 233 of the slider 23. The outer cover 222 may be connected, directly or indirectly, to the inner cover 221. The outer cover 222 may have a fourth contact surface 2221 facing a fourth surface 234 of the slider 23.

In an embodiment, the roller 21 may be in line-contact with the slider housing 22. The contact area between the slider 23 and the slider housing 22 may decrease. The roller 21 may include a third exposed part 211 and a fourth exposed part 212.

In an embodiment, the third exposed part 211 and the fourth exposed part 212 may be provided on opposite sides of each other based on the slider 23. The third exposed part 211 and the fourth exposed part 212 may be exposed to the outside of the slider 23 and in line-contact with the slider housing 22.

In an embodiment, the third exposed part 211 may be in line-contact with the third contact surface 2211. The roller 21 may be in line-contact with the inner cover 221 while being accommodated in the slider 23. The contact area between the slider 23 and the inner cover 221 may decrease. Damage or wear of the third surface 233 of the slider 23 due to friction generated between the third surface 233 and the third contact surface 2211 may decrease.

In an embodiment, the fourth exposed part 212 may in line-contact with the fourth contact surface 2221. The roller 21 may in line-contact with the outer cover 222 while being accommodated in the slider 23. The contact area between the slider 23 and the outer cover 222 may decrease. Damage or wear of the fourth surface 234 of the slider 23 due to friction generated between the fourth surface 234 and the fourth contact surface 2221 may decrease.

In an embodiment, the roller 21 may maintain a state of contacting the third contact surface 2211 and the fourth contact surface 2221 at the same time. The minimum distance between the third contact surface 2211 and the fourth contact surface 2221 may be the same as the diameter of the roller 21. The roller 21 may maintain a state of contacting the inner cover 221 and the outer cover 222 at the same time while being accommodated in the slider 23. The slider 23 may move in the y-axis direction or the z-axis direction without separating in the x-axis direction. A squeak generated between the slider housing 22 and the slider 23 may decrease.

Figure 11:
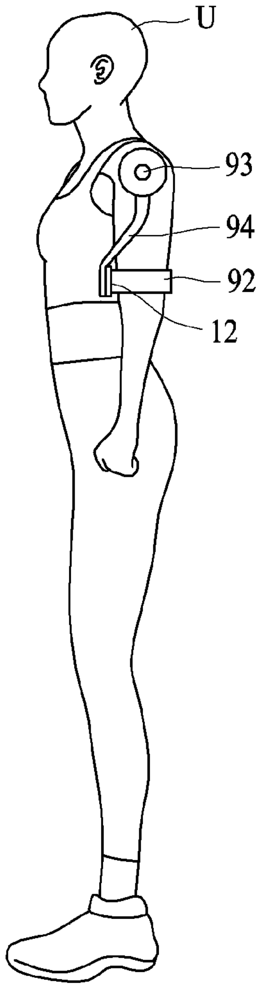
FIG. 11 is a schematic perspective view illustrating a user wearing an exercise assistance device on the upper arm of the user, according to an example embodiment.

FIG. 11 is a schematic perspective view illustrating a user wearing an exercise assistance device on the upper arm of the user, according to an embodiment.

Referring to FIG. 11, an exercise assistance device may be worn on the upper arm of a user U. For example, the actuator 93 of the exercise assistance device may be provided near the shoulder of the user U and the driving frame 94 may be connected to the actuator 93 and disposed along the upper arm of the user U. The slider housing 12 may be provided on the forearm of the user U. The distal support part 92 may surround and support the forearm of the user U all around.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Accordingly, other implementations are within the scope of the following claims.

The invention claimed is:

1. A wearable exercise assistance device comprising:

a proximal support configured to support a proximal portion of a user;

a distal support configured to support a distal portion of the user;

an actuator connected to the proximal support and configured to generate power;

a driving frame configured to transmit power from the actuator to at least the distal support;

a slider housing connected to the distal support and comprising a sliding space;

a slider slidably provided in the sliding space;

a connector configured to connect the slider and the driving frame; and a plurality of balls accommodated in the slider, rotatably provided by at least two degrees of freedom with respect to the slider, and point-contactable with the slider housing.

2. The exercise assistance device of claim 1, wherein the plurality of balls comprise a first ball and a second ball, and wherein the first ball comprises a first exposed part and a second exposed part that are exposed to an outside of the slider and in point-contact with the slider housing, wherein the first exposed part and the second exposed part are provided on opposite sides of each other based on the slider.

3. The exercise assistance device of claim 2, wherein the slider housing comprises:

an inner cover configured for contacting the distal portion of the user and comprising a first contact surface facing a first surface of the slider;

an outer cover connected to the inner cover and comprising a second contact surface facing a second surface of the slider; and a connector accommodating hole formed in the outer cover and configured to accommodate the connector.

4. The exercise assistance device of claim 3, wherein the first exposed part is point-contactable with the first contact surface and the second exposed part is point-contactable with the second contact surface.

5. The exercise assistance device of claim 4, wherein a minimum distance between the first contact surface and the second contact surface is the same as a diameter of the ball.

6. The exercise assistance device of claim 5, wherein the ball is configured to maintain a state of contacting the first contact surface and the second contact surface at the same time.

7. The exercise assistance device of claim 3, wherein the slider housing comprises a cover protrusion protruding from the outer cover in a direction toward the slider.

8. The exercise assistance device of claim 3, wherein the connector comprises:

a connector base connected to the slider and movable in the connector accommodating hole; and a connector body formed in a direction stacked from the connector base and connected to the driving frame.

9. The exercise assistance device of claim 8, wherein at least a portion of the connector body has a spherical shape.

10. The exercise assistance device of claim 1, wherein at least a portion of the plurality of balls is provided on opposite sides of each other based on the connector.

11. The exercise assistance device of claim 1, wherein the slider comprises:

a slider body comprising a ball accommodating hole that accommodates each of the plurality of balls; and a slider cover connected to the slider body and capable of covering a portion of each of the plurality of balls.

12. The exercise assistance device of claim 1, further comprising:

an elastic band configured to connect the slider housing and the slider.

13. The exercise assistance device of claim 12, wherein the elastic band comprises:

a band body connected to the slider; and a plurality of band legs extending from the band body and connected to the slider housing.

14. The exercise assistance device of claim 12, wherein the elastic band is provided in plurality, wherein at least a portion of the plurality of elastic bands is provided on opposite sides of each other based on the connector.

15. An exercise assistance device comprising:

a proximal support configured to support a proximal portion of a user;

a distal support configured to support a distal portion of the user;

an actuator connected to the proximal support and configured to generate power;

a driving frame configured to transmit power from the actuator to at least the distal support;

a slider housing connected to the distal support and comprising a sliding space;

a slider slidably provided in the sliding space;

a connector configured to connect the slider and the driving frame; and a plurality of rollers accommodated in the slider, rotatably provided with respect to the slider, and line-contactable with the slider housing.

16. The exercise assistance device of claim 15, wherein the plurality of rollers comprise first and second rollers, where at least one of the first and second rollers comprises a third exposed part and a fourth exposed part that are exposed to an outside of the slider and in line-contact with the slider housing, wherein the third exposed part and the fourth exposed part are provided on opposite sides of each other based on the slider.

17. The exercise assistance device of claim 16, wherein the slider housing comprises:

an inner cover configured for contacting the distal portion of the user and comprising a third contact surface facing a third surface of the slider; and an outer cover connected to the inner cover and comprising a fourth contact surface facing a fourth surface of the slider.

18. The exercise assistance device of claim 17, wherein the third exposed part is line-contactable with the third contact surface and the fourth exposed part is line-contactable with the fourth contact surface.

19. The exercise assistance device of claim 18, wherein a minimum distance between the third contact surface and the fourth contact surface is substantially the same as a diameter of the roller.

20. The exercise assistance device of claim 19, wherein the at least one of the first and second rollers is configured to maintain a state of contacting the third contact surface and the fourth contact surface at the same time.

* * * * *